US011429051B2

United States Patent
Nakata

(10) Patent No.: US 11,429,051 B2
(45) Date of Patent: Aug. 30, 2022

(54) SHEET TRANSPORTATION DEVICE, IMAGE READING APPARATUS, AND IMAGE FORMING APPARATUS

(71) Applicant: FUJIFILM Business Innovation Corp., Tokyo (JP)

(72) Inventor: Ryusuke Nakata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 166 days.

(21) Appl. No.: 16/521,552

(22) Filed: Jul. 24, 2019

(65) Prior Publication Data
US 2020/0310320 A1    Oct. 1, 2020

(30) Foreign Application Priority Data

Mar. 28, 2019 (JP) .............................. JP2019-062108

(51) Int. Cl.
*G03G 15/00* (2006.01)
*B65H 1/04* (2006.01)
*B65H 1/26* (2006.01)
*H04N 1/00* (2006.01)

(52) U.S. Cl.
CPC .......... *G03G 15/6511* (2013.01); *B65H 1/04* (2013.01); *B65H 1/266* (2013.01); *H04N 1/00795* (2013.01)

(58) Field of Classification Search
CPC ...... B65H 1/04; B65H 1/266; G30G 15/6511; H04N 1/00795; G03G 15/6511
See application file for complete search history.

(56) References Cited

U.S. PATENT DOCUMENTS

| 5,681,036 A * | 10/1997 | Wakahara | B65H 5/062 271/10.12 |
| 6,040,923 A * | 3/2000 | Takashimizu | H04N 1/00681 271/262 |
| 2005/0127597 A1* | 6/2005 | Sano | B65H 7/125 271/258.01 |
| 2012/0001386 A1* | 1/2012 | Nishikata | B65H 7/14 271/265.01 |
| 2017/0008723 A1* | 1/2017 | Shimizu | B31F 5/02 |

FOREIGN PATENT DOCUMENTS

JP         2014-036349      2/2014

* cited by examiner

*Primary Examiner* — David H Banh
(74) *Attorney, Agent, or Firm* — JCIPRNET

(57) ABSTRACT

A sheet transportation device includes a sheet loading table, a feeding unit that feeds a sheet placed on the sheet loading table, a first detection unit that is provided downstream of the feeding unit in a sheet transportation direction and that detects a position of a leading end of the sheet, a second detection unit that is provided upstream of the feeding unit in the sheet transportation direction and that detects a position of a leading end of a small-size sheet which is smaller than the sheet detected by the first detection unit, and a control unit that starts feeding the sheet based on a result of detection performed by any of the first detection unit or the second detection unit in accordance with a size of the sheet.

20 Claims, 13 Drawing Sheets

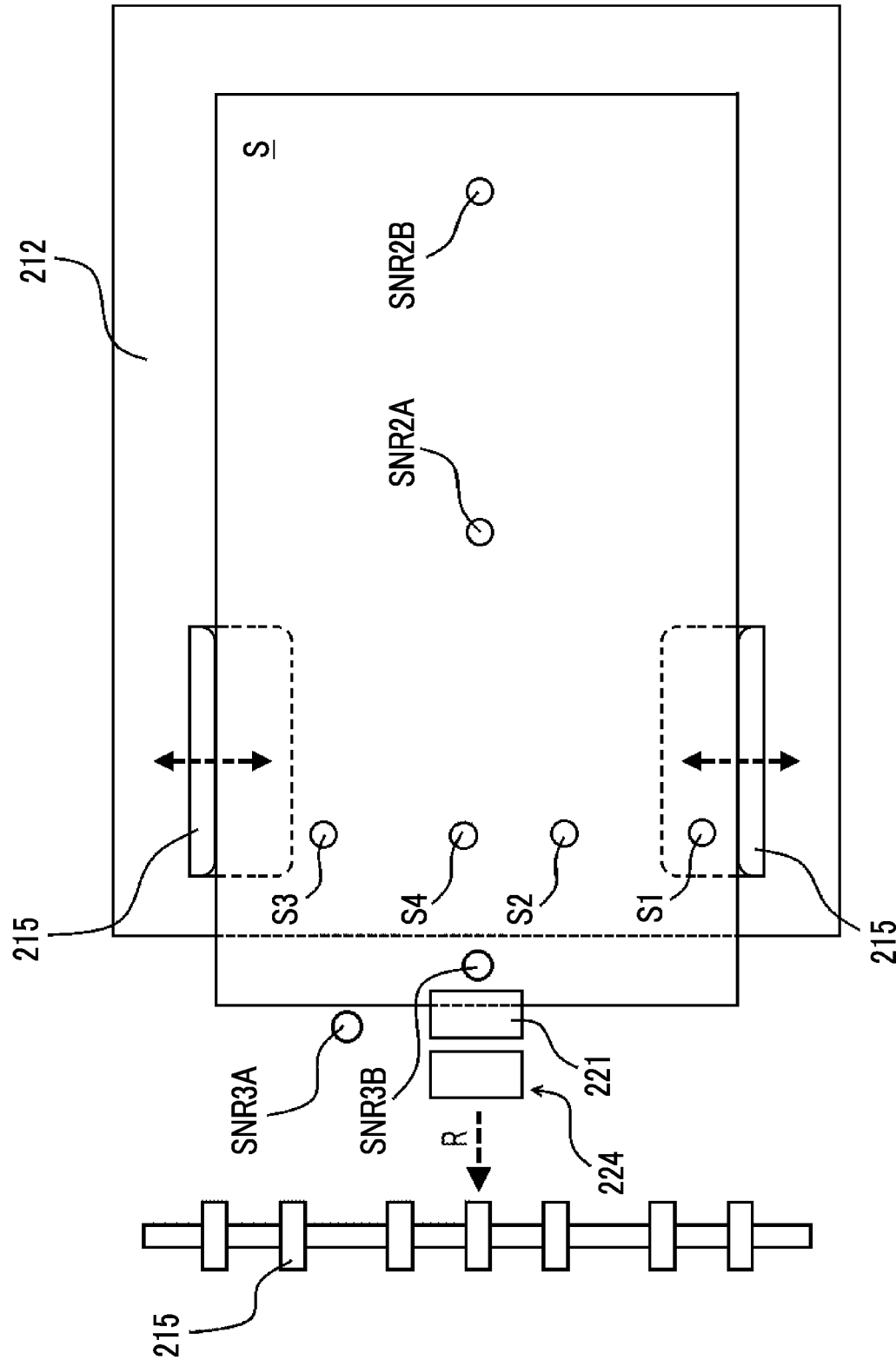

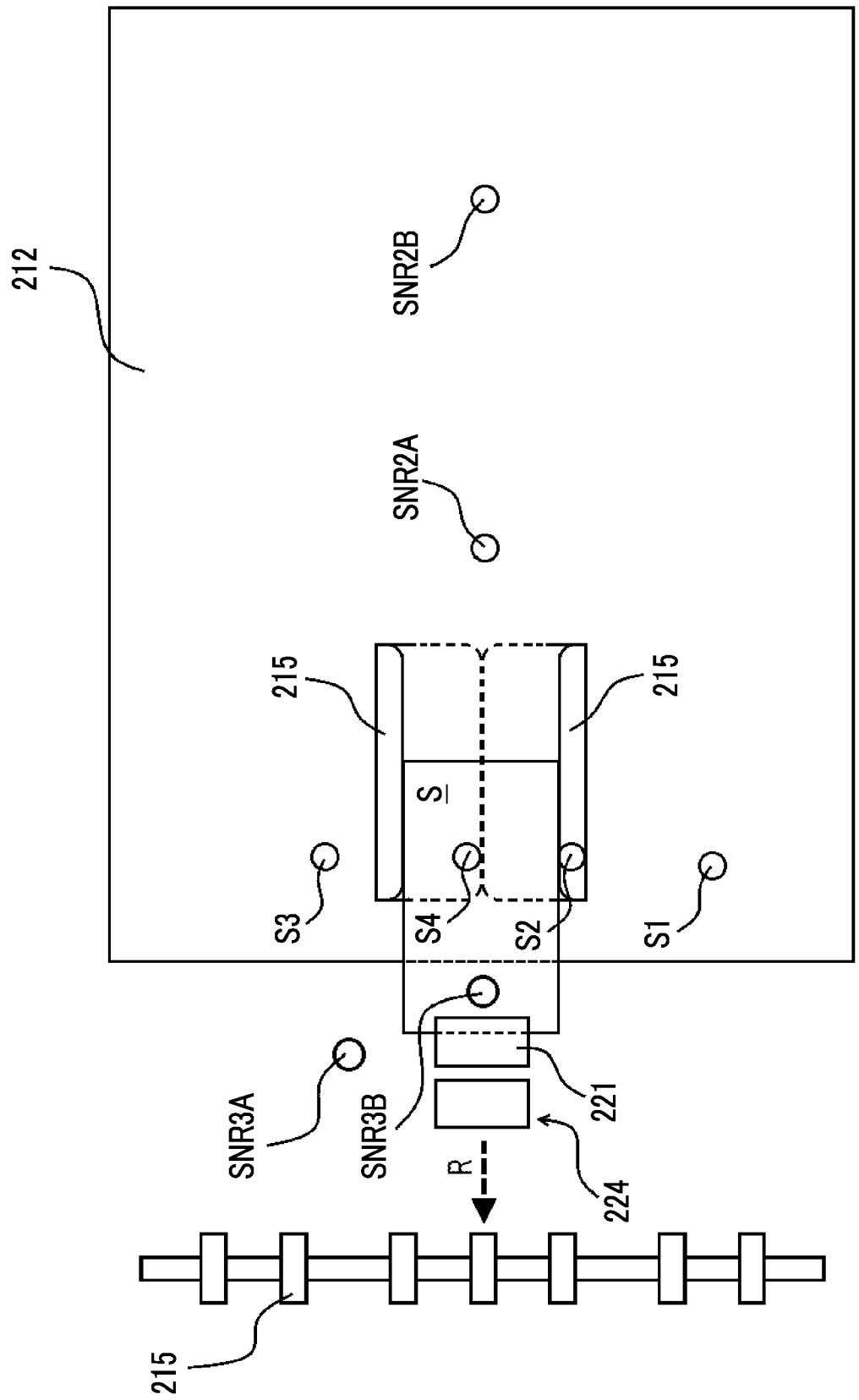

FIG.7

| MAIN SCANNING DIRECTION SIZE DETERMINATION (DOCUMENT WIDTH DETECTION SENSOR) | | | | | SUB SCANNING DIRECTION SIZE DETERMINATION (DOCUMENT LENGTH DETECTION SENSOR) | | |
|---|---|---|---|---|---|---|---|
| | SNR S1 | SNR S2 | SNR S3 | SNR S4 | 85mm TO 198.5mm | 198.6 TO 309.9mm | 310.0mm TO |
| | | | | | SNR2A/SNR2B | SNR2A/SNR2B | SNR2A/SNR2B |
| | | | | | off/off | on/off | on/on |
| 55.1 TO 136.8 | off | off | off | on | BUSINESS CARD RECEIPT | – | – |
| 136.9 TO 175.8 | off | off | on | on | – | A5 S<br>5.5 × 8.5 S | – |
| 175.9 TO 208.0 | off | off | off | on | – | B5 S<br>SIXTEENMO S<br>8 × 10 S<br>8 × 10.5 S | – |
| 208.1 TO 214.4 | off | on | off | on | A5 L | A4 S | – |
| 214.5 TO 250.6 | off | on | on | on | 5.5 × 8.5 L | 8.5 × 11 S | 8.5 × 13 S<br>8.5 × 13.4 S<br>8.5 × 14 S |
| 250.7 TO 262.6 | on | off | on | on | B5 L | 8 × 10 L | B4 S |
| 262.7 TO 273.8 | on | off | off | on | SIXTEENMO L<br>Executive L | 8 × 10.5 L | OCTAVO S |
| 273.9 TO 285.8 | on | on | off | on | – | 8.5 × 11 L | 11 × 15 S<br>11 × 17 S |
| 285.9 TO 304.0 | on | on | on | on | – | A4 L | A3 S |

SHEET TRANSPORTATION DEVICE, IMAGE READING APPARATUS, AND IMAGE FORMING APPARATUS

CROSS-REFERENCE TO RELATED APPLICATIONS

This application is based on and claims priority under 35 USC 119 from Japanese Patent Application No. 2019-062108 filed Mar. 28, 2019.

BACKGROUND

(i) Technical Field

The present invention relates to a sheet transportation device, an image reading apparatus, and an image forming apparatus.

(ii) Related Art

An image reading apparatus which includes: a document table on which a document is placed; a reading unit that includes a light source irradiating the document table with light and that detects reflected light, with which the light source irradiates the document, so as to perform an image reading operation in a main scanning direction of the document; a moving unit that can move a reading position of the reading unit in a sub scanning direction; and a control unit that moves, by means of the moving unit, the reading position from a home position at which the image reading operation is started to a plurality of different set positions in the sub scanning direction which are set in advance in accordance with the size of the document and that specifies the size of the document based on the presence or absence of the document detected by the reading unit or the length of the document in the main scanning direction and the position of the document is known (JP2014-036349A). The control unit can perform a first specifying step of specifying the size of the document by moving the reading position to a first position, which is one of the plurality of set positions, and a second specifying step of specifying the size of the document by moving the reading position to a second position, which is different from the first position and is one of the plurality of set positions, in a case where the document cannot be detected in the first specifying step or there are a plurality of candidates for the specified size of the document. The second position is a position closer to the home position than the first position in a case where the document cannot be detected in the first specifying step and the second position is a position farther from the home position than the first position in a case where the document can be detected in the first specifying step.

SUMMARY

Aspects of non-limiting embodiments of the present disclosure relate to a sheet transportation device, an image reading apparatus, and an image forming apparatus with which it is possible to detect the position of a leading end of a small-size sheet in a transportation direction while suppressing transportation failure caused by positional deviation of a leading end of a sheet having a certain size that is loaded on a sheet loading table.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transportation device including a sheet loading table, a feeding unit that feeds a sheet placed on the sheet loading table, a first detection unit that is provided downstream of the feeding unit in a sheet transportation direction and detects a position of a leading end of the sheet, a second detection unit that is provided upstream of the feeding unit in the sheet transportation direction and detects a position of a leading end of a small-size sheet which is smaller than the sheet detected by the first detection unit, and a control unit that starts feeding of the sheet based on a result of detection performed by any of the first detection unit or the second detection unit in accordance with a size of the sheet.

BRIEF DESCRIPTION OF THE DRAWINGS

Exemplary embodiment(s) of the present invention will be described in detail based on the following figures, wherein:

FIG. 5 is a schematic plan view illustrating a relationship between disposition of sheet detection sensors in a sheet loading section and a normal-size sheet;

FIG. 6 is a schematic plan view illustrating a relationship between disposition of the sheet detection sensors in the sheet loading section and a small-size sheet;

FIG. 7 is a table illustrating an example of a sheet size measurement pattern;

DETAILED DESCRIPTION

Figure 1:
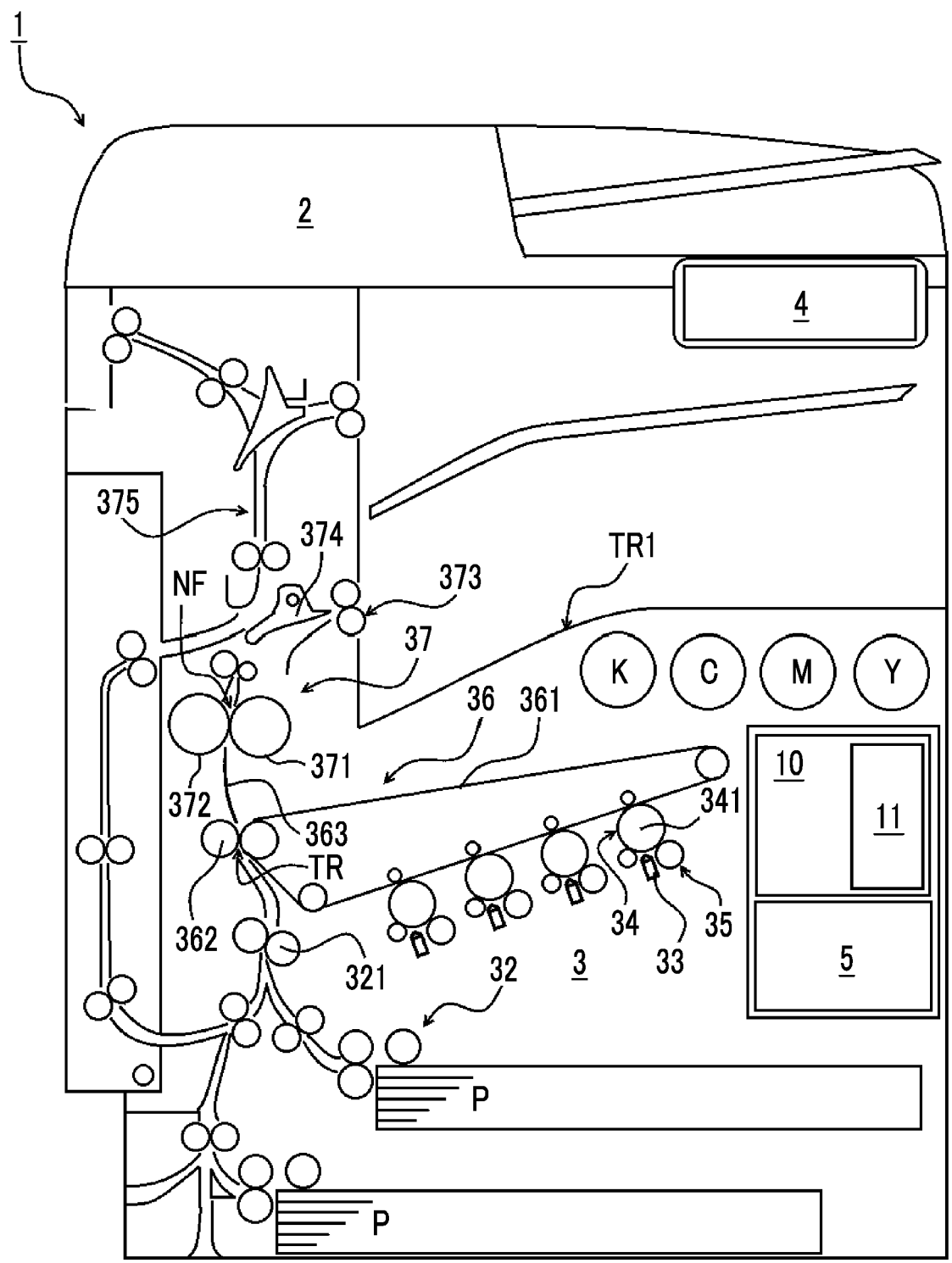
FIG. 1 is a schematic sectional view illustrating an internal configuration of an image forming apparatus.

Next, the present invention will be described in detail by means of an exemplary embodiment and a specific example with reference to drawings. However, the present invention is not limited to the exemplary embodiment and specific example.

In addition, in the following description which will be made using the drawings, the drawings are schematic drawings and note that ratios between dimensions or the like are different from actual ratios. In order to facilitate understanding the invention, members other than members necessary for description are appropriately omitted in the drawings.

1. Entire Configuration and Operation of Image Forming Apparatus

Figure 2:
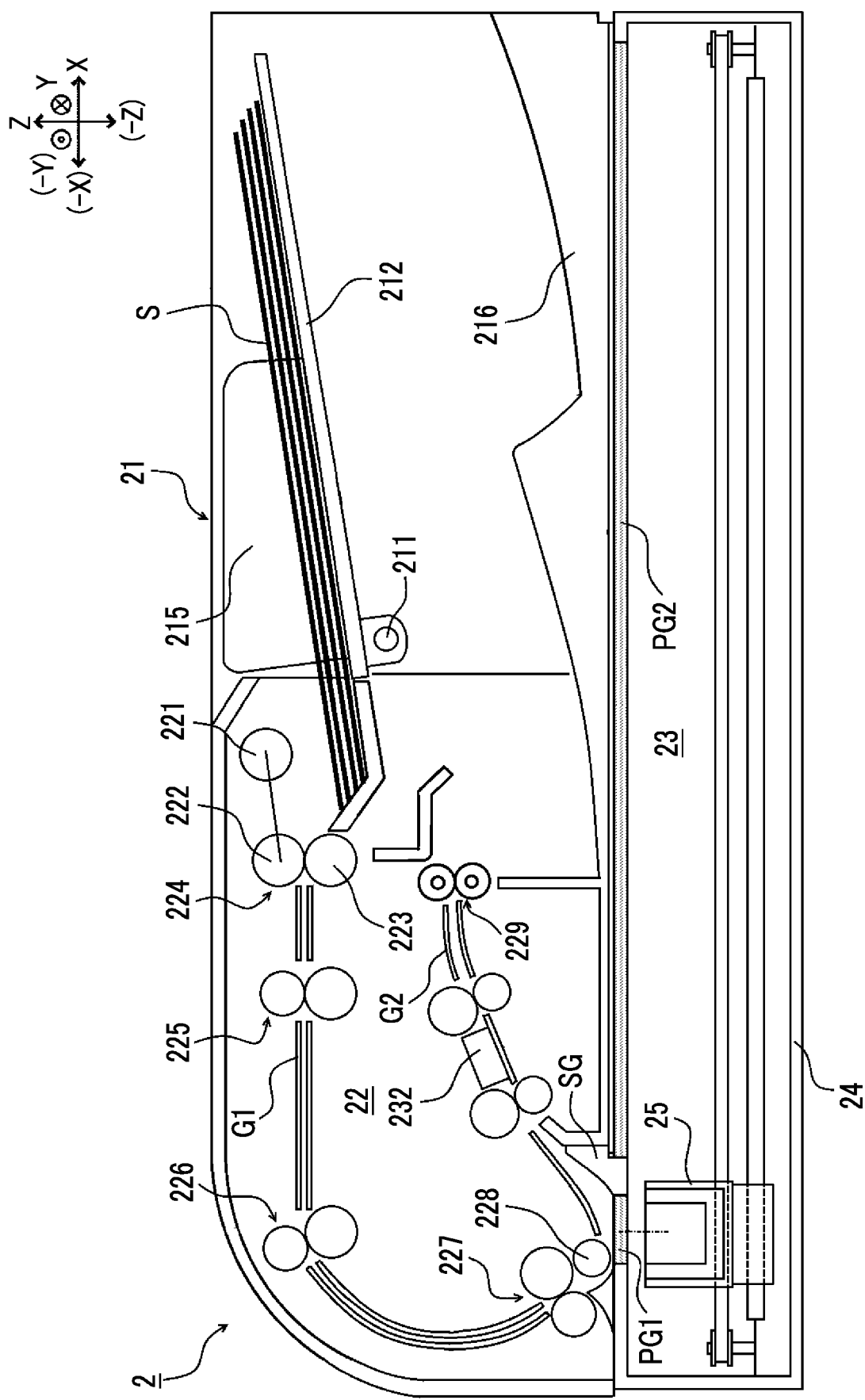
FIG. 2 is a sectional configuration view illustrating an internal configuration of an image reading apparatus.
Figure 3:
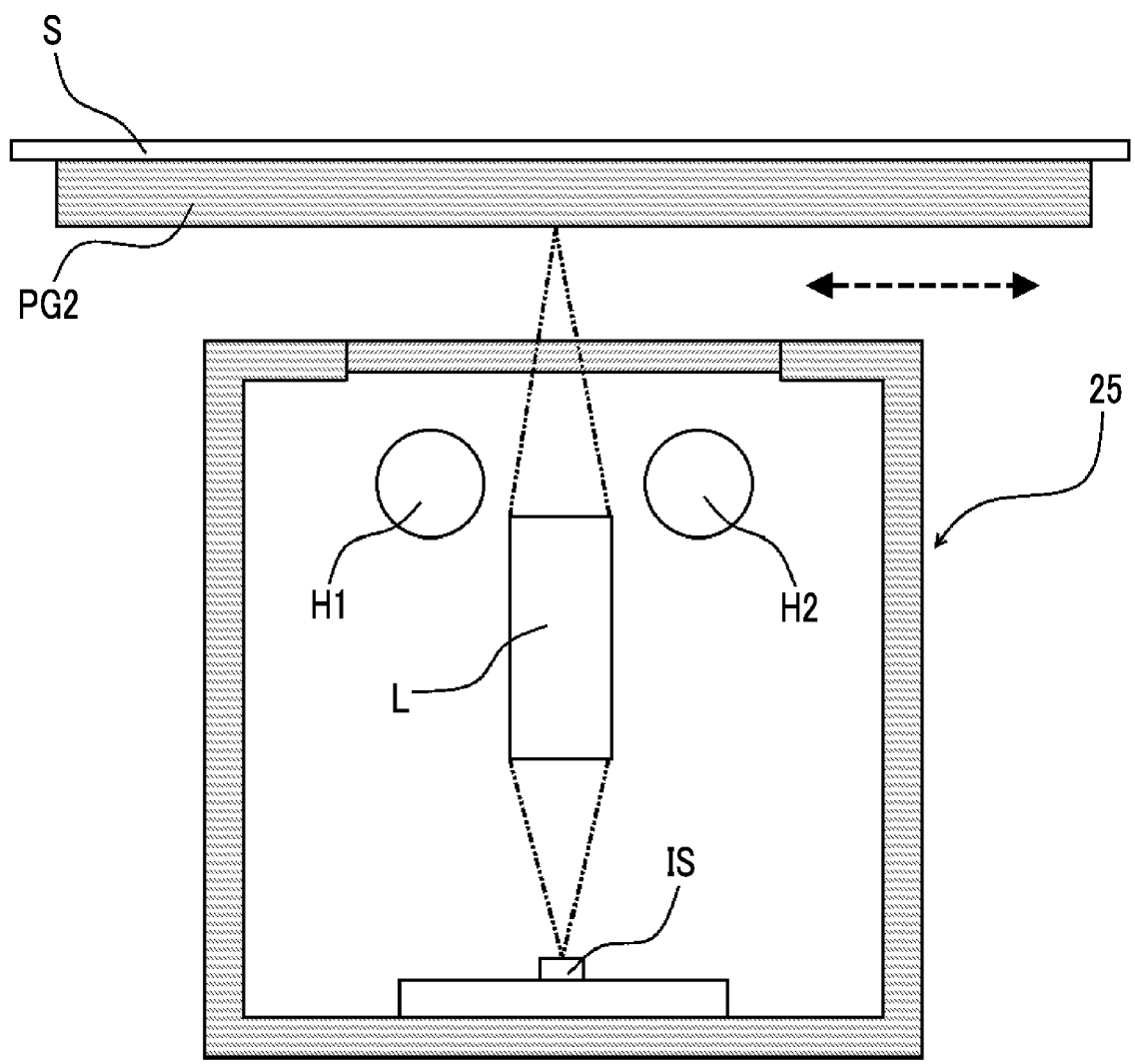
FIG. 3 is a schematic sectional view illustrating an image reading unit of the image reading apparatus.
Figure 4:
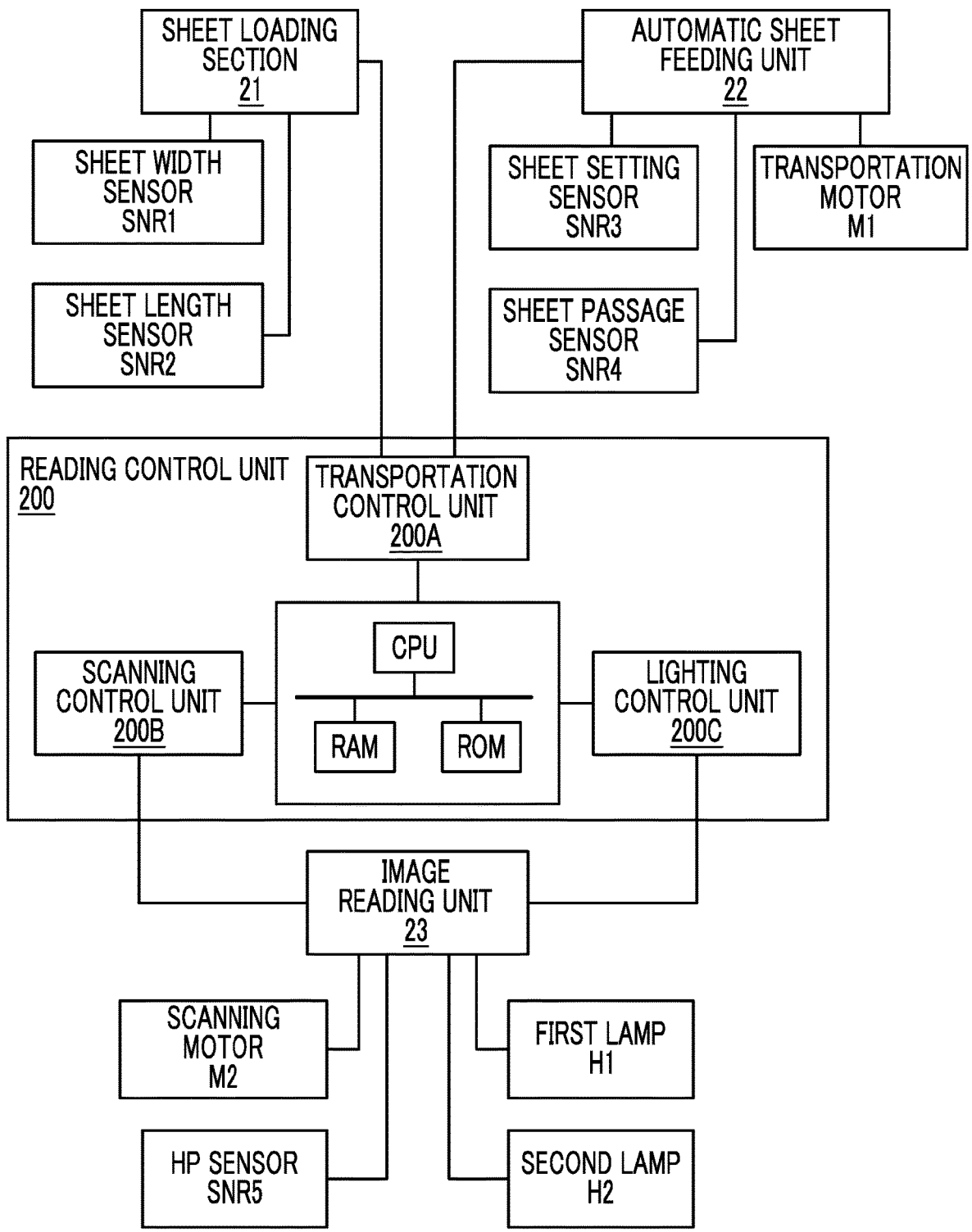
FIG. 4 is a functional block diagram of a reading control unit.

FIG. 1 is a schematic sectional view illustrating an internal configuration of an image forming apparatus 1 according to the exemplary embodiment, FIG. 2 is a sectional configuration view illustrating an internal configuration of an image reading apparatus 2, FIG. 3 is a schematic sectional view illustrating an image reading unit of the image reading apparatus 2, and FIG. 4 is a functional block diagram of a reading control unit. Hereinafter, the entire configuration and operation of the image forming apparatus 1 will be described with reference to the drawings.

1.1. Entire Configuration

The image forming apparatus 1 is configured to include an image reading apparatus 2 that reads an image from a sheet S such as a document and converts the image into image data, an image forming unit 3 serving as an image recording unit printing the read image data on a paper sheet which is a recording medium, an operation information unit 4 serving as a user interface, and an image processing unit 5.

The image reading apparatus 2 is configured to include a sheet loading section 21 which is an example of a sheet loading table, a sheet transportation device including an automatic sheet feeding unit 22, and an image reading unit 23 which is an example of an imaging unit.

The automatic sheet feeding unit 22 transports the sheet S placed on the sheet loading section 21 to a reading position of the image reading unit 23 and an image read by an image sensor IS such as a charge coupled device (CCD) line sensor or the like of the image reading unit 23 is converted into image data which is electric signals.

The image forming unit 3 is configured to include a paper feeding device 32, exposure devices 33, photoreceptor units 34, developing devices 35, a transferring device 36, and a fixation device 37 and forms image information received from the image processing unit 5 on a paper sheet P fed from the paper feeding device 32 in the form of a toner image.

The operation information unit 4 serving as a user interface is disposed close to a front surface of the image reading apparatus 2. The operation information unit 4 is configured of a combination of a liquid crystal display panel, various operation buttons, a touch panel, and the like. A user of the image forming apparatus 1 performs various setting operations or inputs instructions via the operation information unit 4. In addition, various information items are displayed to the user of the image forming apparatus 1 via the liquid display panel.

The image processing unit 5 generates image data from an image read by the image reading apparatus 2 and printing information transmitted from an external machine (for example, personal computer or like).

1.2. Image Forming Unit

Regarding the image forming unit 3, the designated paper sheet P is fed to the image forming unit 3 from the paper feeding device 32 in accordance with the timing of image formation each time printing on one paper sheet is performed in a printing job.

The photoreceptor units 34 are provided to be arranged above the paper feeding device 32 and are provided with photosensitive drums 341 which are driven to rotate. The developing devices 35 respectively form a yellow (Y) toner image, a magenta (M) toner image, a cyan (C) toner image, and a black (K) toner image on the photosensitive drums 341 on which electrostatic latent images are formed by the exposure devices 33.

The color toner images formed on the photosensitive drums 341 of the photoreceptor units 34 are sequentially electrostatically transferred (primary transfer) onto an intermediate transfer belt 361 of the transferring device 36 such that a superimposition toner image in which color toners are superimposed on each other is formed. The superimposition toner image on the intermediate transfer belt 361 is collectively transferred to the paper sheet P, which is fed from a pair of resist rollers 321 and is guided by a transportation guide, by a secondary transfer roller 362.

Regarding the fixation device 37, a fixation nip NF (fixation region) is formed in a pressure-contact region between a heating module 371 and a pressing module 372, which form a pair.

The paper sheet P, onto which the toner image is collectively transferred at the transferring device 36, is transported to the fixation nip NF of the fixation device 37 via a transportation guide 363 with the toner image being not fixed thereto. The toner image is fixed to the paper sheet P by means of heating and pressing operations performed by the heating module 371 and the pressing module 372, which form a pair.

The paper sheet P with a fixation toner image formed thereon is guided to a switching gate 374 and is discharged to a discharge tray portion TR1 on an upper surface of the image forming apparatus 1 through a pair of first discharge rollers 373 such that the paper P is accommodated in the discharge tray portion TR1. In addition, in a case where the paper sheet is inverted for duplex printing or is discharged with an image recording surface facing an upper side, a transportation direction is switched to a direction toward a transportation path 375 at the switching gate 374.

1.3. Image Reading Apparatus

The sheet loading section 21 is provided with a sheet tray 212 on which the sheet S with an image recorded thereon is placed.

The automatic sheet feeding unit 22 is provided with a separation unit 224 including a nudger roller 221 that draws out sheets S loaded on the sheet tray 212 in order from the top, a feed roller 222, and a retard roller 223.

In the separation unit 224, the feed roller 222 and the retard roller 223 forms a pair and in a case where the sheets S are fed to a nip portion N while being overlapped by each other, the sheets S are separated from each other (handled) and are transported to the image reading unit 23 one by one.

In a sheet transportation path G1, a take-away roller 225 is disposed downstream of the feed roller 222 in the transportation direction of the sheet S. The take-away roller 225 transports the sheet S fed from the feed roller 222 to a pre-resist roller 226.

A resist roller 227 that adjusts the timing of transportation of the sheet S is disposed downstream of the pre-resist roller 226. The pre-resist roller 226 forms a loop with a leading end of the sheet S abutting onto the resist roller 227 in a stopped state such that inclination is corrected. The resist roller 227 is driven to rotate in accordance with the timing of the start of a reading operation and the sheet S is pressed against reading glass PG1 by a platen roller 228 in a state where the loop is maintained by the take-away roller 225 and the pre-resist roller 226 such that a front surface of the sheet S is read by the image reading unit 23.

After passing through the reading glass PG1, the sheet S is transported to a reading sensor 232 while being guided by a sheet guide SG. After the front surface of the sheet S is read by the image reading unit 23, the sheet S is transported through a sheet transportation path G2 while a rear surface thereof is read by the reading sensor 232 and is discharged to a discharge tray 216 formed below the sheet loading section 21 via a discharge roller 229.

The image reading unit 23 is configured such that platen glass PG2 on which the sheet S is placed is disposed on an upper surface of a casing 24 and a carriage 25 provided to be able to reciprocate in a sub scanning direction (lateral direction: X direction) is disposed inside the casing 24.

In the carriage 25, a first lamp H1 and a second lamp H2 which include light emitting diodes (LED) irradiating the sheet S on the platen glass PG2, an image forming lens L through which an image is formed by means of light reflected from the sheet S at a predetermined magnification, and an image sensor (solid-state image sensing device which uses CMOS) IS are installed. The image sensor IS is a reading sensor for reading an image on the sheet S and generates an analog image signal in accordance with the light reflected from the sheet S.

In a case where the sheet S is placed on the platen glass PG2, image information is read in a line-by-line manner with the carriage 25 being sequentially moved in the sub scanning direction (X direction) such that the light reflected from the sheet S is introduced into the image sensor IS and the entire image on the sheet S is read.

1.4. Functional Block Configuration of Reading Control Unit

As shown in FIG. 4, the image reading apparatus 2 controls the operations of the sheet loading section 21, the automatic sheet feeding unit 22, and the image reading unit 23 by means of a reading control unit 200.

A transportation control unit 200A acquires detection information about the size or the like of the sheet S from a sheet width sensor SNR1 and a sheet length sensor SNR2 in the sheet loading section 21. In addition, the transportation control unit 200A performs drive control of a transportation motor M1 (not shown) in the automatic sheet feeding unit 22 and acquires sheet detection information from a sheet setting sensor SNR3 and detection information from a sheet passage sensor SNR4 that detects passage of the sheet S in the sheet transportation path G1.

A scanning control unit 200B performs drive control of a scanning motor M2 (not shown) for scanning below the reading glass PG1 and the platen glass PG2 and acquires detection information from a home position (HP) sensor SNR5 that detects a document reading position at which one surface (front surface) of the sheet S transported along the reading glass PG1 is read.

A lighting control unit 200c performs lighting control of light emitting elements of the first lamp H1 and the second lamp H2 based on driving current signals thereof.

2. Configuration and Operation of Main Part of Image Reading Apparatus 2.1. Sheet Size Measurement FIG. 5 is a schematic plan view illustrating a relationship between disposition of sheet detection sensors in the sheet loading section 21 and a normal-size sheet, FIG. 6 is a schematic plan view illustrating a relationship between disposition of the sheet detection sensors in the sheet loading section 21 and a small-size sheet, and FIG. 7 is a table illustrating an example of a sheet size measurement pattern.

Hereinafter, sheet size measurement in the sheet loading section 21 will be described with reference to drawings.

The sheet loading section 21 supports the sheet tray 212 such that the sheet tray 212 can rotate upward around a rotation shaft 211 (refer to FIG. 2) and sheets that are different from each other in size, that is, sheets S that are different from each other in at least one of sheet length or sheet width can be loaded onto the sheet loading section 21, the sheet length being a distance in a sheet transportation direction (arrow R in FIGS. 5 and 6) and the sheet width being a distance in a direction intersecting (orthogonal to) the sheet transportation direction.

A first setting gate 220A and a second setting gate 220B (refer to FIG. 8), which are an example of an aligning member, are disposed at a feeding section of the automatic sheet feeding unit 22 and one end side (leading end side in sheet transportation direction) of each of the sheets S loaded on an upper surface 212a of the sheet tray 212 comes into contact with the first setting gate 220A and the second setting gate 220B such that leading ends of the sheets are aligned with each other.

A pair of side guides 215 which is an example of a regulating unit that regulates the width direction of the sheet S is disposed in the direction intersecting (orthogonal to) the sheet transportation direction and a center registration system in which side ends in a sheet width direction are aligned in the width direction based on the side guides 215 is adopted.

The sheet loading section 21 is provided with the sheet width sensor SNR1 that measures the sheet width of the sheet S placed on the sheet tray 212. The sheet width sensor SNR1 is provided with four light sensors S1, S2, S3, and S4, as shown in FIGS. 5 and 6, which are arranged along an actuator (not shown) that integrally moves with the side guides 215 in a case where the side guides 215 slide. In addition, a relative positional relationship between the actuator and the light sensors S1, S2, S3, and S4 is set such that the on-off states of the four light sensors S1, S2, S3, and S4 are switched in a plurality of patterns depending on the position of the side guide 215.

In addition, as shown in FIGS. 5 and 6, the sheet loading section 21 is provided with sheet length sensors SNR2A and SNR2B that measure the sheet length of the sheet S placed on the sheet tray 212. The sheet length sensors SNR2A and SNR2B are disposed on the sheet tray 212 to be arranged along the transportation direction of the sheet S and measure the sheet length of the sheet S placed on the sheet tray 212.

On the sheet tray 212, all of the sheets S are placed with leading ends of the sheets S being aligned with each other regardless of a difference between the sizes of the sheets S. Therefore, the positions of rear ends of the sheets S depend on the sheet lengths of the sheets S placed on the sheet tray 212 and a rear end of a sheet S of which the sheet length is long is positioned further from the nudger roller 221 than a rear end of a sheet S of which the sheet length is short.

The sheet length sensor SNR2A is disposed at a position close to the nudger roller 221 and detects a sheet S of which the sheet length is short and the sheet length sensor SNR2B is disposed downstream of the sheet length sensor SNR2A in the sheet transportation direction to be disposed at a position far from the nudger roller 221 and detects a sheet S of which the sheet length is long.

In addition, the relative positional relationship is set such that the on-off states of the sheet length sensors SNR2A and SNR2B are switched in three patterns depending on the sheet length of the sheet S.

With the sheet width sensor SNR1 and the sheet length sensors SNR2A and SNR2B disposed as described above, a sheet placed on the sheet tray 212 corresponds to any one of the plurality of patterns which are shown in FIG. 7 as an example and thus it is possible to figure out the size of the sheet S. Particularly, in a case where a sheet placed on the sheet tray 212 is a small-size sheet MN such as a name card NC or a receipt RS, only the light sensor S4 of the sheet width sensor SNR1, as shown in FIG. 6, which is disposed on an innermost side is turned on and the sheet length sensors SNR2A and SNR2B are turned off such that the sheet is detected as the small-size sheet MN.

2.2. Detection of Sheet Leading End Position

Figure 8:
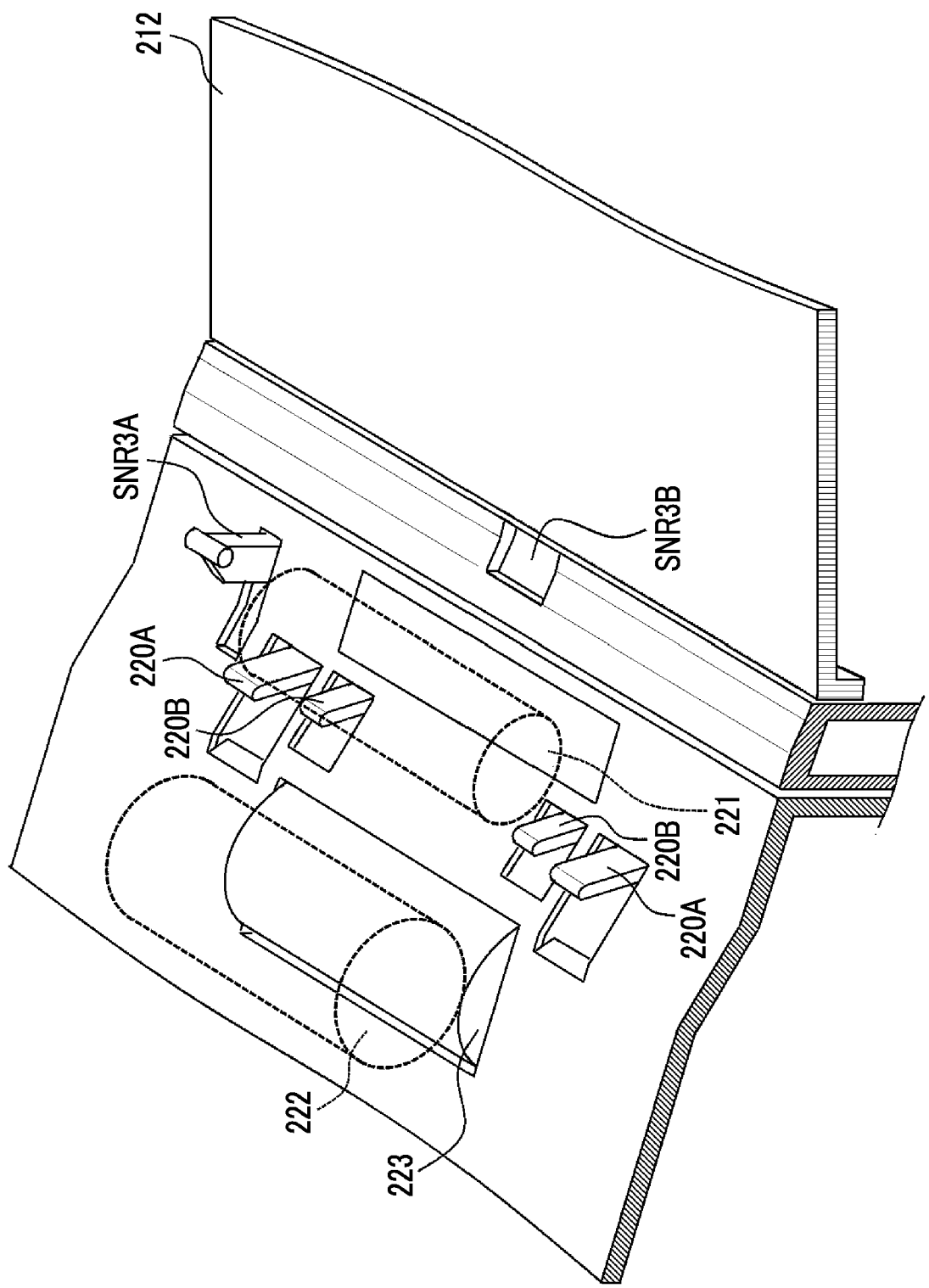
FIG. 8 is a perspective view illustrating a configuration of a feeding section.
Figure 9A:
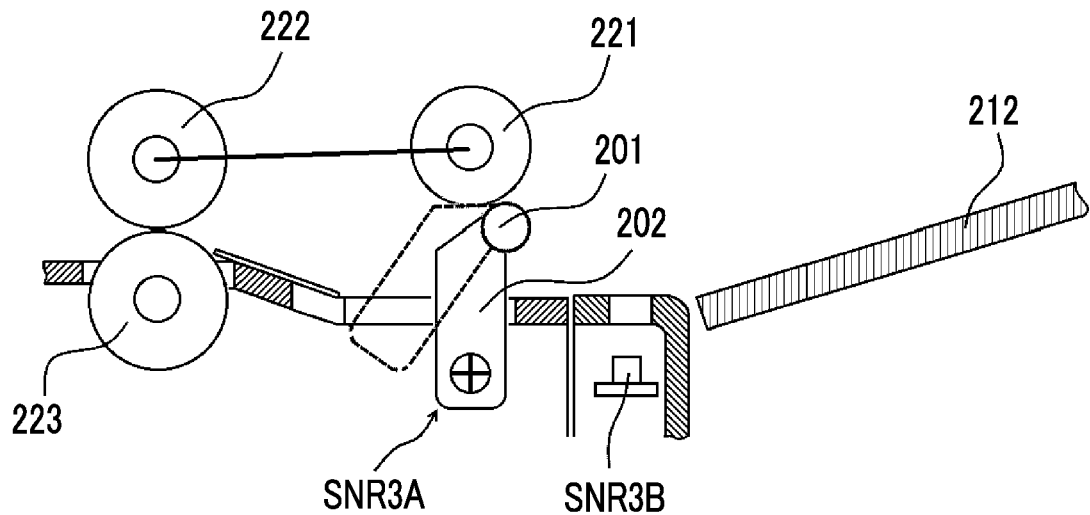
FIG. 9A is a schematic sectional view illustrating the feeding section and FIG. 9B is a plan view illustrating disposition of a first setting sensor, a second setting sensor, a first setting gate, and a second setting gate in the feeding section.
Figure 9B:
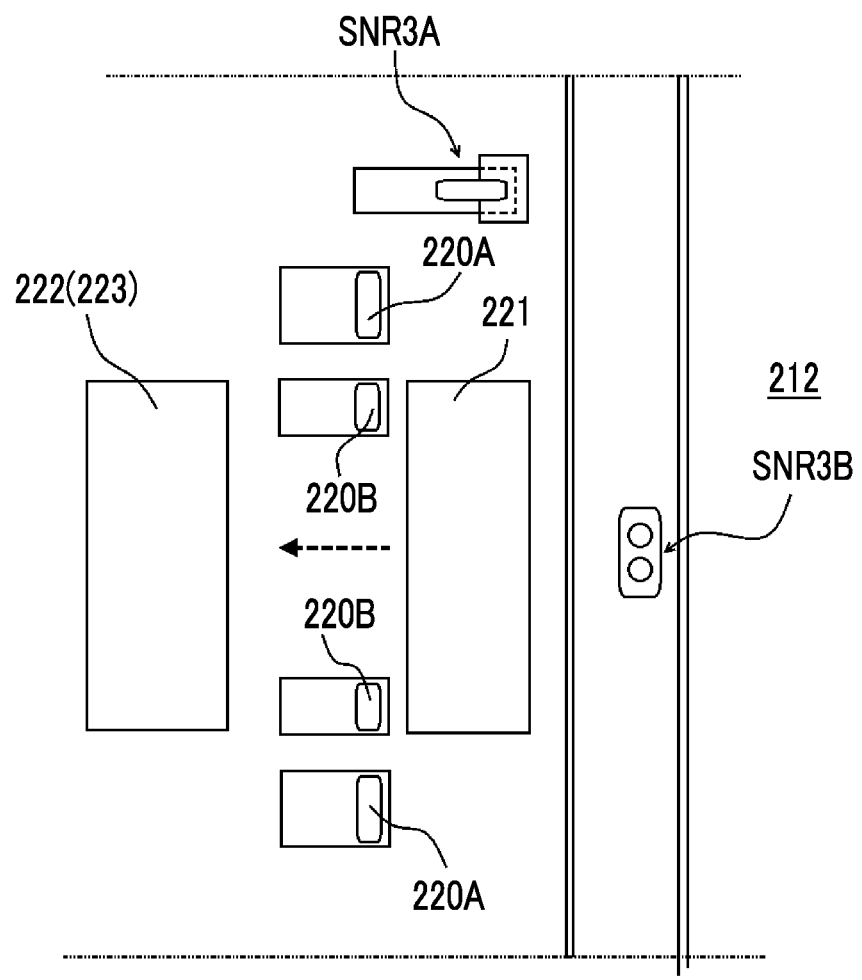
Figure 10:
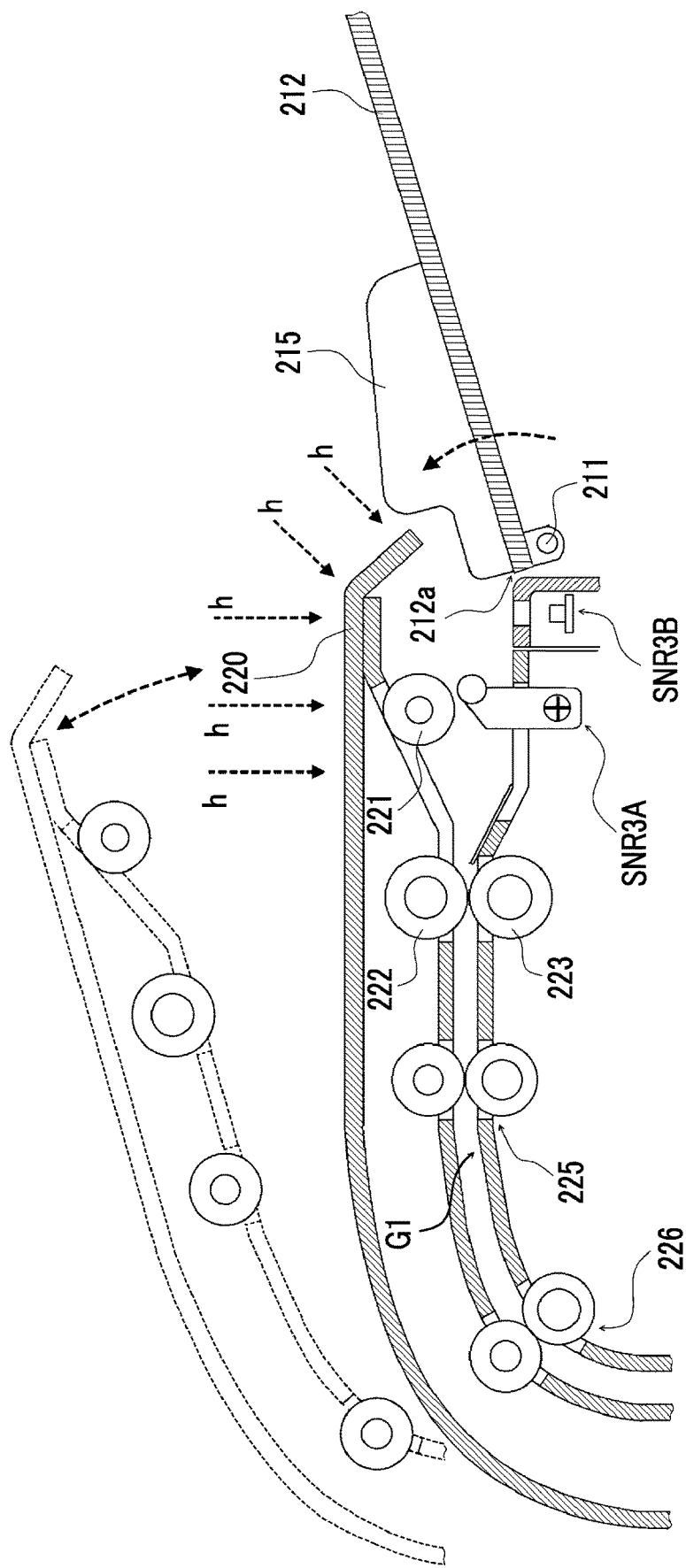
FIG. 10 is a schematic sectional view illustrating a relationship between the feeding section and an opening and closing cover.

FIG. 8 is a perspective view illustrating a configuration of the feeding section, FIG. 9A is a schematic sectional view illustrating the feeding section, FIG. 9B is a plan view illustrating disposition of a first setting sensor SNR3A, a second setting sensor SNR3B, the first setting gate 220A, and the second setting gate 220B, and FIG. 10 is a schematic sectional view illustrating a relationship between the feeding section and an opening and closing cover 220.

As shown in FIG. 8, in the feeding section, the nudger roller 221 feeding the sheet S is disposed downstream of the sheet tray 212 in the sheet transportation direction. At a standby time at which no sheet S is placed on the sheet tray 212, the nudger roller 221 is held at a standby position on an upper side. When the feeding of the sheet S is started, the nudger roller 221 descends to a feeding position from the standby position and rotates while being in contact with the uppermost surface of the sheet S such that the sheet S on the sheet tray 212 is fed.

The first setting sensor SNR3A, which is an example of a first detection unit that detects the position of a leading end of a normal-size sheet S other than small-size sheets, is disposed downstream of the nudger roller 221 in the sheet transportation direction. The first setting sensor SNR3A includes an actuator 202 rotatably supported by a shaft portion 201 and a transmission type light sensor (not shown) that receives light emitted from a light emitting unit by means of a light receiving unit facing light the light emitting unit. The first setting sensor SNR3A detects the leading end of the sheet S in a case where the leading end of the sheet S comes into contact with the actuator 202 and the actuator 202 is pressed to be positioned downstream of the feeding position of the nudger roller 221 in the sheet transportation direction.

Accordingly, the leading end is positioned close to the separation unit 224 when the normal-size sheet S starts to be fed and the leading end of the sheet S is positioned downstream of the nudger roller 221 in the sheet transportation direction in comparison with a case where the first setting sensor SNR3A detects the leading end of the sheet at a position upstream of the nudger roller 221. Therefore, it is possible to suppress misfeed. However, in the exemplary embodiment, it is not possible to detect the small-size sheet MN since the first setting sensor SNR3A is disposed outward of the nudger roller 221 in the width direction of the sheet S.

The second setting sensor SNR3B, which is an example of a second detection unit that detects the position of a leading end of a small-size sheet smaller than the sheet S detected by the first setting sensor SNR3A, is disposed upstream of the nudger roller 221 in the sheet transportation direction. As shown in FIGS. 9A and 9B, the second setting sensor SNR3B is a reflection type light sensor that receives, via the sheet S, light emitted from a light emitting unit by means of a light receiving unit that is provided on the same plane as the light emitting unit. The second setting sensor SNR3B is disposed on an approximately central position with respect to the roller width of the nudger roller 221 in the width direction of the sheet S.

Since the second setting sensor SNR3B is configured as the reflection type light sensor, detection accuracy with respect to the position of a leading end of the receipt RS, which is a curled sheet that is easily folded, is improved in comparison with the case of an actuator type.

As shown in FIG. 10, the second setting sensor SNR3B is disposed downstream of the side guides 215 in the sheet transportation direction. Accordingly, it is possible to detect the leading end of the small-size sheet MN although the leading end is detected at a position upstream of the nudger roller 221.

As shown in FIG. 10, the second setting sensor SNR3B is disposed downstream of a front end 212a of the sheet tray 212 in the sheet transportation direction, the sheet tray 212 being supported such that the sheet tray 212 can rotate upward around the rotation shaft 211. Accordingly, it is possible to prevent erroneous detection of the small-size sheet MN even if the sheet tray 212 is operated in the middle of sheet transportation.

In addition, the second setting sensor SNR3B which is a reflection type light sensor is provided at a position covered, as seen in a plan view, by an opening and closing member 220 that is openably and closably disposed such that the feeding section and the sheet transportation path G1 are exposed. Accordingly, it is possible to prevent erroneous detection of the small-size sheet while suppress light from the outside entering the second setting sensor SNR3B.

The first setting gate 220A and the second setting gate 220B, which are an example of the aligning member, are disposed downstream of the nudger roller 221 in the sheet transportation direction.

The first setting gate 220A and the second setting gate 220B are rotatably supported. Before the sheet S is fed, the first setting gate 220A and the second setting gate 220B are held in a state of protruding upward from a sheet transportation surface and the leading ends of the sheets S in the transportation direction can abut onto the first setting gate 220A and the second setting gate 220B such that the leading ends are aligned with each other. In addition, in a case where the feeding of the sheet S is started, the first setting gate 220A and second setting gate 220B held in the state of protruding upward are released such that the first setting gate 220A and second setting gate 220B can rotate toward a downstream side and transportation of the sheet S is not inhibited.

The first setting gate 220A is disposed outward of the roller width of the nudger roller 221 in the width direction of the sheet S and the leading ends of the normal-size sheets S other than the small-size sheet MN can abut onto the first setting gate 220A such that the leading ends are aligned with each other.

The second setting gate 220B is disposed inward of the roller width of the nudger roller 221 in the width direction of the sheet S and the leading ends of the small-size sheets MN can abut onto the second setting gate 220B such that the leading ends are aligned with each other.

2.3. Sheet Feeding Operation

Figure 11A:
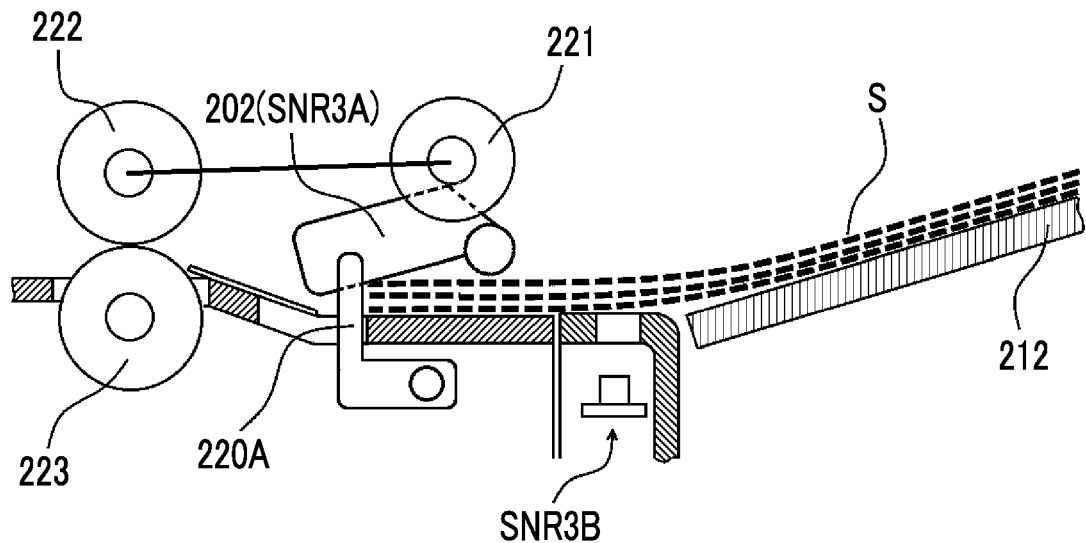
FIG. 11A is a schematic sectional view illustrating the feeding section in which normal-size sheets have been set and FIG. 11B is a plan view illustrating a relationship between the normal-size sheets, the first setting sensor, the second setting sensor, the first setting gate, and the second setting gate.
Figure 11B:
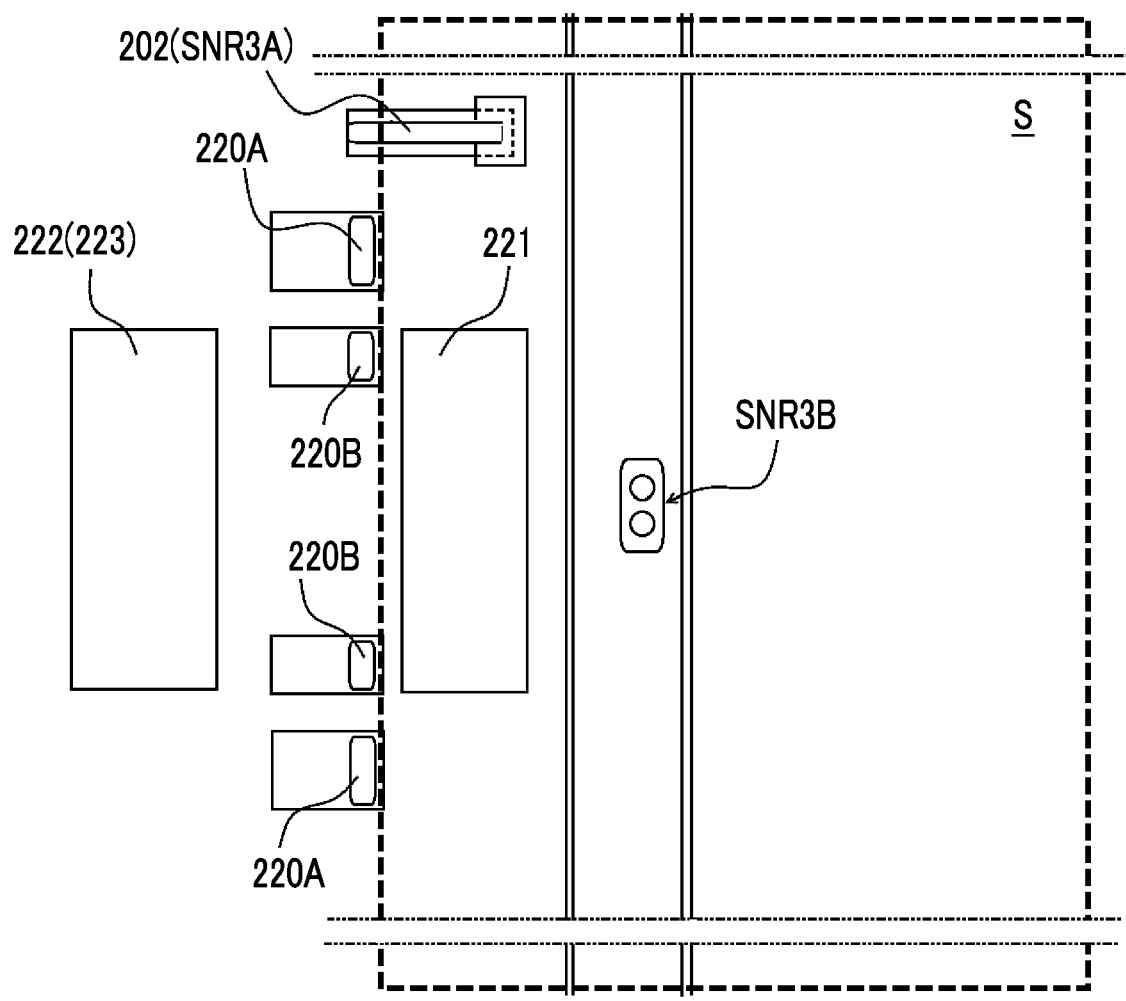
Figure 12A:
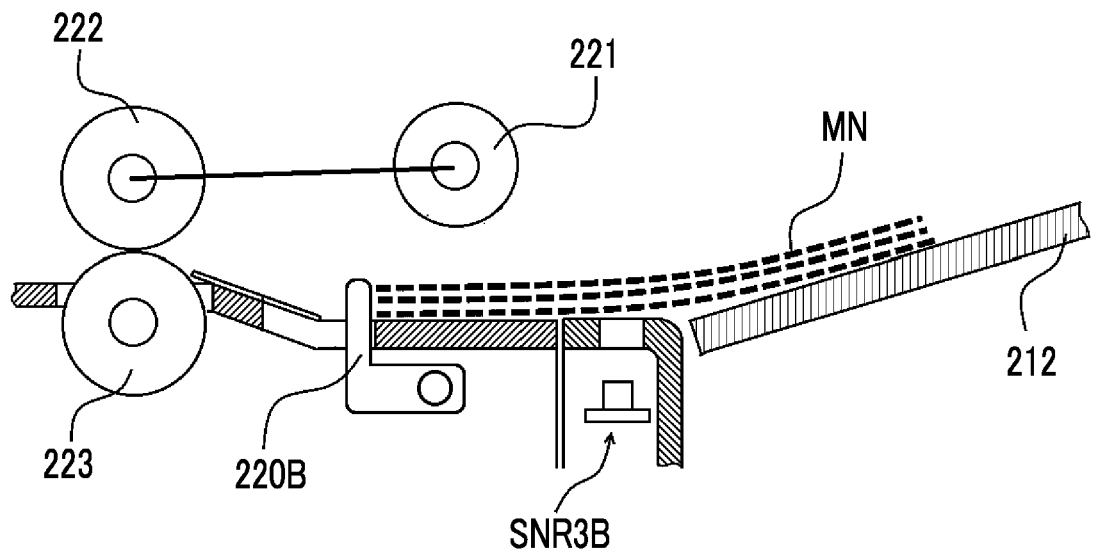
FIG. 12A is a schematic sectional view illustrating the feeding section in which small-size sheets have been set and FIG. 12B is a plan view illustrating a relationship between the small-size sheets, the second setting sensor, and the second setting gate.
Figure 12B:
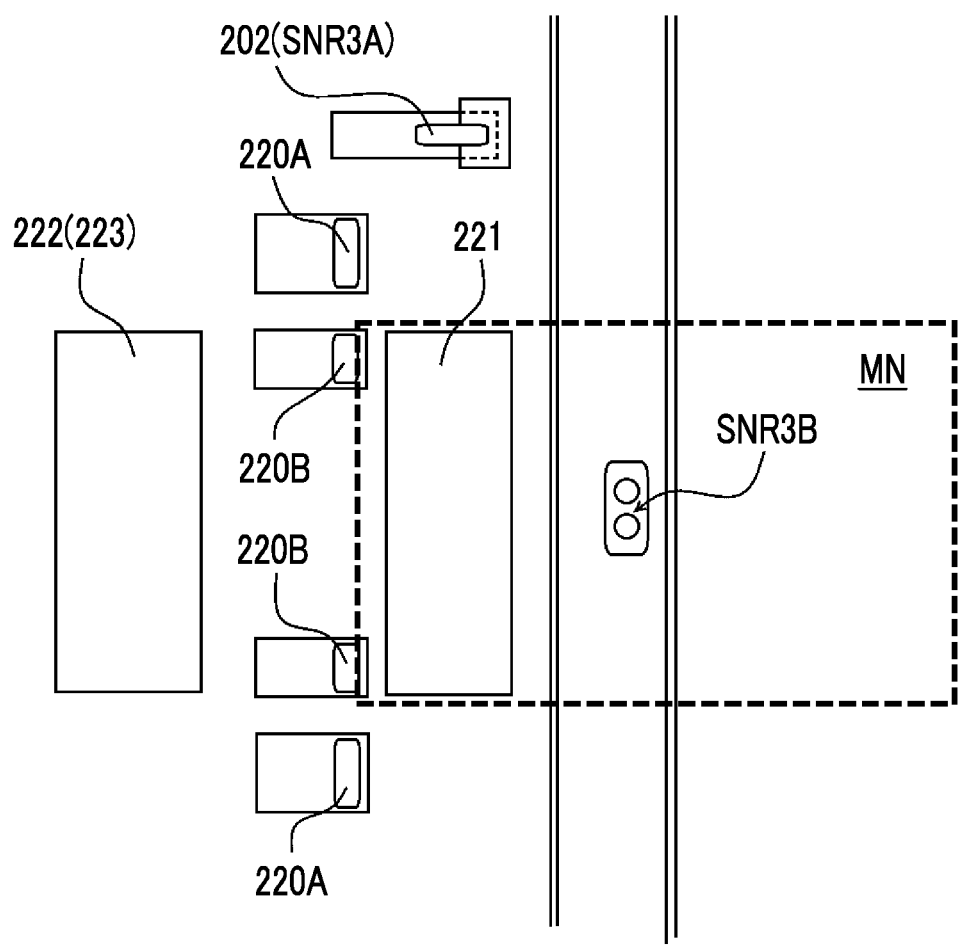
Figure 13:
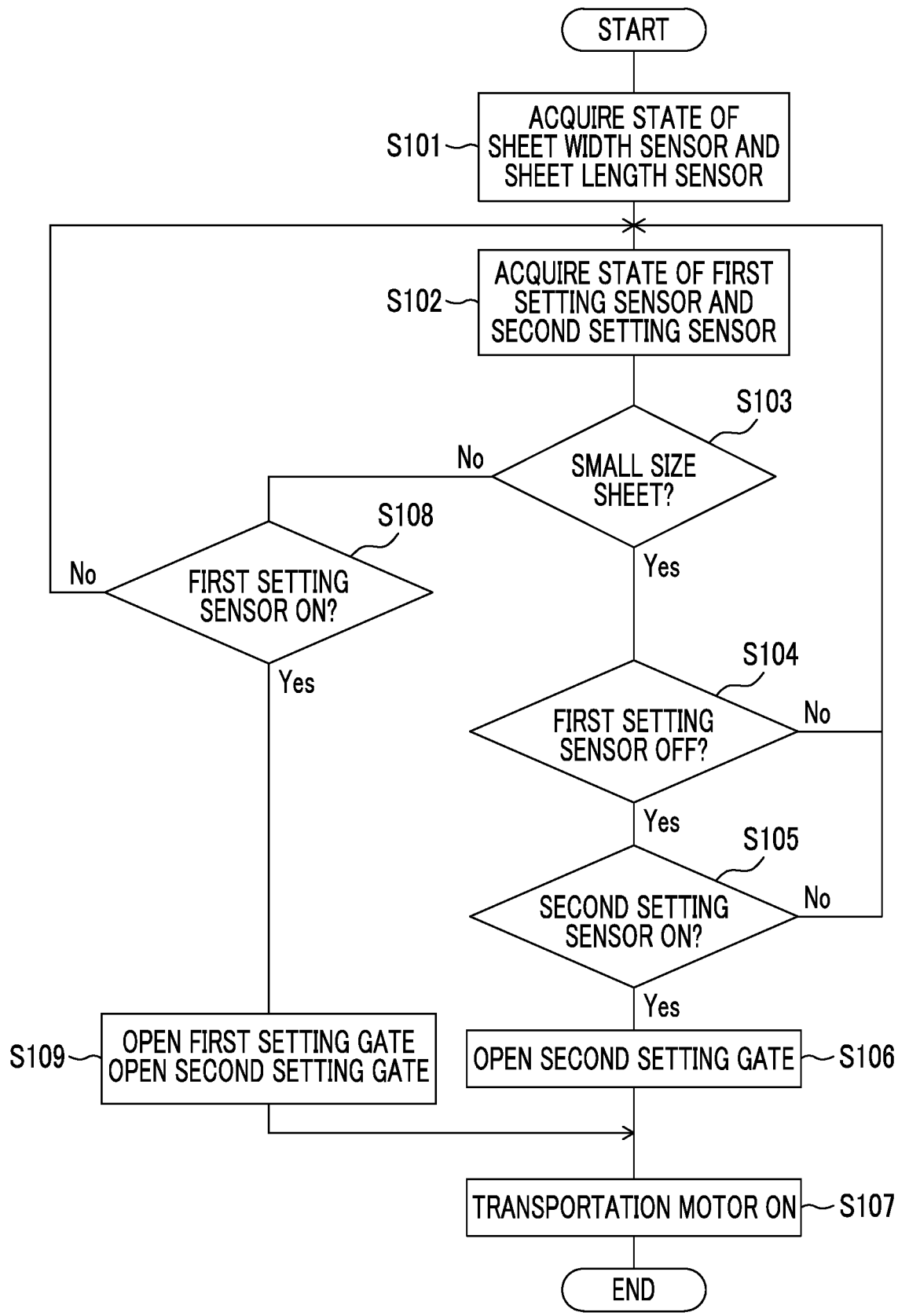
FIG. 13 is a flowchart illustrating the flow of a sheet feeding operation in an automatic sheet feeding unit.

FIG. 11A is a schematic sectional view illustrating the feeding section in which normal-size sheets have been set, FIG. 11B is a plan view illustrating a relationship between the normal-size sheets, the first setting sensor SNR3A, the second setting sensor SNR3B, the first setting gate 220A, and the second setting gate 220B, FIG. 12A is a schematic sectional view illustrating the feeding section in which small-size sheets have been set, FIG. 12B is a plan view illustrating a relationship between the small-size sheets, the second setting sensor SNR3B, and the second setting gate 220B, and FIG. 13 is a flowchart illustrating the flow of a sheet feeding operation in the automatic sheet feeding unit 22.

In a case where the normal-size sheets S other than the small-size sheets MN are placed on the sheet tray 212, as shown in FIG. 11A, the leading ends of the sheets S press the actuator 202 of the first setting sensor SNR3A toward the downstream side in the sheet transportation direction and abut onto the first setting gate 220A and the second setting gate 220B such that the leading ends are aligned with each other.

In a case where the small-size sheets MN are placed on the sheet tray 212, as shown in FIG. 12A, the leading ends of the small-size sheets MN are detected by the second setting sensor SNR3B and abut onto the second setting gate 220B such that the leading ends are aligned with each other.

In a case where the sheet S is placed on the sheet tray 212 of the image reading apparatus 2 provided with the first setting sensor SNR3A and the second setting sensor SNR3B as described above and the sheet S is fed, the transportation control unit 200A which is an example of a control unit acquires detection information about the size or the like of the sheet S from the sheet width sensor SNR1 and the sheet length sensor SNR2 in the sheet loading section 21 (S101) and acquires detection information of the first setting sensor SNR3A and the second setting sensor SNR3B (S102).

Then, the transportation control unit 200A determines the size of the placed sheet S based on the acquired detection information of the sheet width sensor SNR1 and the sheet length sensor SNR2 (S103). In a case where the sheet S is the small-size sheet MN (S103: Yes), it is determined whether the first setting sensor SNR3A is OFF or not (S104). In a case where the first setting sensor SNR3A is OFF (S104: Yes), it is determined whether the second setting sensor SNR3B is ON or not (S105). In a case where the second setting sensor SNR3B is ON (S105: Yes), the second setting gate 220B is opened (S106) and the transportation motor M1 is driven to rotate (S107) such that the feeding of the sheet S is started.

In a case where the sheet S is not the small-size sheet MN (S103: No), it is determined whether the first setting sensor SNR3A is ON or not (S108). In a case where the first setting sensor SNR3A is ON (S108: Yes), the first setting gate 220A and the second setting gate 220B are opened (S109) and the transportation motor M1 is driven to rotate (S107) such that the feeding of the sheet S is started.

As described above, in a case where it is determined that the size of the sheet S placed on the sheet tray 212 is small based on the acquired detection information of the sheet width sensor SNR1 and the sheet length sensor SNR2, the transportation control unit 200A starts the feeding of the sheet S based on the result of detection performed by the second setting sensor SNR3B such that transportation failure of the small-size sheet MN is able to be suppressed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sheet transportation device comprising:
   a sheet loading table;
   a feeding unit, comprising a feeding roller, that feeds a sheet placed on the sheet loading table;
   a first sensor, provided substantially in line with the feeding roller and configured to detect a position of a leading end of the sheet;
   a second sensor, provided upstream of the feeding unit and upstream of the first sensor in the sheet transportation direction and configured to detect a presence of a leading end of a small-size sheet which is smaller than the sheet detected by the first sensor; and
   a processor configured to start feeding of the sheet based on a result of detection performed by any of the first sensor or the second sensor in accordance with a detection of the sheet or the small-size sheet.

2. The sheet transportation device according to claim 1, wherein the processor further configured to start the feeding of the sheet based on the result of detection performed by the second sensor only in a case where the small-size sheet is fed.

3. The sheet transportation device according to claim 1, wherein the first sensor is further configured to detect the position of the leading end of the sheet when the leading end of the sheet is positioned substantially in line with the feeding roller.

4. The sheet transportation device according to claim 3, wherein the first sensor includes an actuator that is displaced with the leading end of the sheet being pressed against the actuator and detects the position of the leading end of the sheet by receiving light emitted from a light emitting unit by means of a light receiving unit provided to face the light emitting unit in a case where the leading end of the sheet is pressed against the actuator.

5. The sheet transportation device according to claim 1, wherein the second sensor further configured to detect the presence of the leading end of the sheet by receiving, via the sheet, light emitted from a light emitting unit by a light receiving unit provided on the same plane as the light emitting unit.

6. The sheet transportation device according to claim 5, wherein the second sensor is provided at a position covered, as seen in a plan view, by an opening and closing member that is openably and closably disposed such that the feeding unit is exposed.

7. The sheet transportation device according to claim 1, wherein the second sensor is provided downstream of a regulating unit in the sheet transportation direction, the regulating unit regulating a width direction of the sheet which intersects the sheet transportation direction.

8. The sheet transportation device according to claim 1, wherein the second sensor is provided downstream of a front end of the sheet loading table in the sheet transportation direction, the sheet loading table rotating around a rotation shaft.

9. The sheet transportation device according to claim 1, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

10. The sheet transportation device according to claim 2, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

11. The sheet transportation device according to claim 3, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

12. The sheet transportation device according to claim 4, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

13. The sheet transportation device according to claim 5, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

14. The sheet transportation device according to claim 6, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

15. The sheet transportation device according to claim 7, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

16. The sheet transportation device according to claim 8, wherein an aligning member onto which the leading end of the small-size sheet abuts and that becomes rotatable toward a downstream side in the sheet transportation direction before the feeding of the sheet is started based on the result of detection performed by the second sensor, is disposed downstream of the second sensor in the sheet transportation direction.

17. An image reading apparatus comprising:
an imaging unit that reads an image on a document; and
the sheet transportation device according to claim 1 that transports the sheet to a reading position at which the imaging unit reads the sheet.

18. An image forming apparatus comprising:
the image reading apparatus according to claim 17 that reads an image on a sheet; and
an image recording unit that records the image read by the image reading apparatus, on a recording medium.

19. A sheet transportation device comprising:
a sheet loading table;
a feeding means, comprising a feeding roller, for feeding a sheet placed on the sheet loading table;
a first detection means for detecting a position of a leading end of the sheet provided at substantially in line with the feeding roller and;
a second detection means for detecting a presence of a leading end of a small-size sheet which is smaller than the sheet detected by the first detection means, provided at upstream of the feeding means and upstream of the first detection means in the sheet transportation direction and;
a control means for starting feeding of the sheet based on a result of detection performed by any of the first detection means or the second detection means in accordance with a detection of the sheet or the small-size sheet.

20. The sheet transportation device of claim 1, further comprising:
a first alignment member, disposed at the downstream of the feeding unit;
a second alignment member, disposed at the downstream of the feeding unit and in line with the first alignment member,
wherein the processor is configured to only open the second alignment member in response to a detection of small-size sheet detected by the second sensor and not the first sensor.

* * * * *